Dec. 10, 1929.  H. D. WILLEY  1,738,626
RETAINING APPLIANCE FOR ARTIFICIAL DENTURES
Filed June 27, 1927
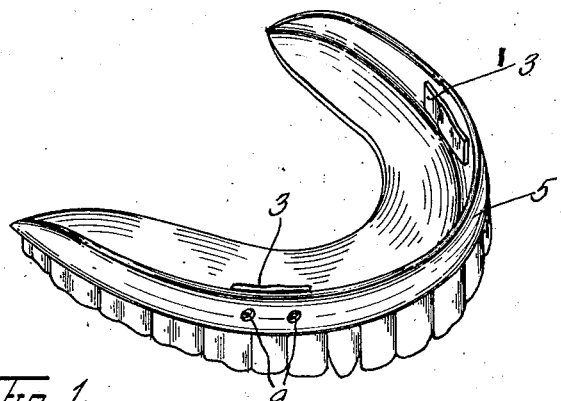
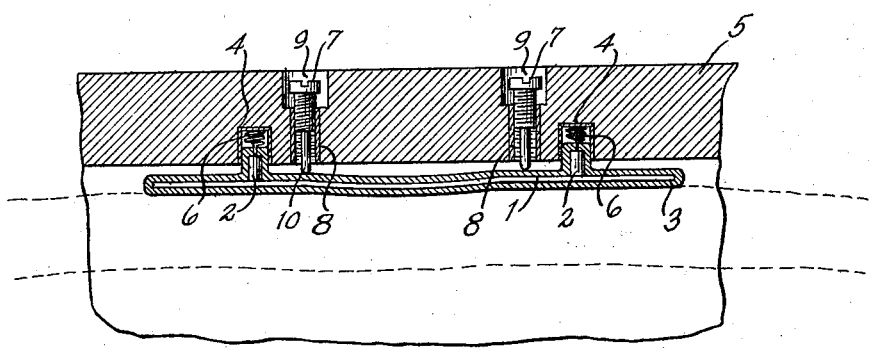
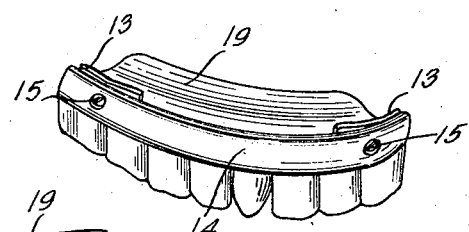
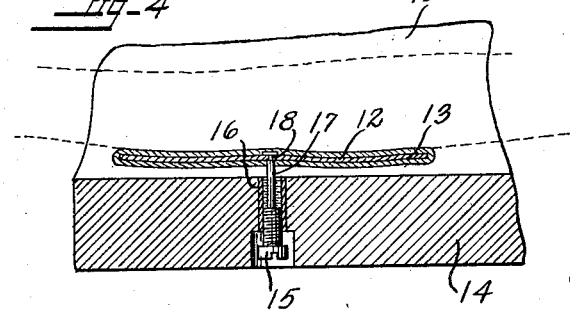
INVENTOR.
H. D. WILLEY
BY
ATTORNEY.

Patented Dec. 10, 1929

1,738,626

UNITED STATES PATENT OFFICE

HARRY D. WILLEY, OF OAKLAND, CALIFORNIA

RETAINING APPLIANCE FOR ARTIFICIAL DENTURES

Application filed June 27, 1927. Serial No. 201,641.

The invention forming the subject matter of this application relates in general to artificial dentures. Particularly, the invention relates to appliances used to retain the dentures in the mouth.

After an artificial denture is completed, it must be fitted to the natural gum of the mouth. Before the artificial dentures are made, a cast of the natural gum is taken. Nevertheless, the artificial gum of the dentures very seldom fits the undercuts and the irregularities of the natural gum of the mouth. It involves a large amount of extra work on the part of the dentist to grind the artificial gum to a perfect fit. Meanwhile, the patient is caused to suffer by the misfit artificial gum.

An object of the invention is to provide a retaining appliance for artificial dentures which can be readily adjusted to the irregularities and undercuts of the natural gum of the mouth, thereby eliminating the alteration of the artificial gum to fit the natural gum.

Another object of the invention is to provide a retaining appliance for dentures which can be pressed against the natural gum of the mouth, thereby firmly securing the artificial dentures therein.

A further object of the present invention is to provide a retaining appliance for dentures in which an adjustable pressure may be exerted against the natural gum of the mouth and which can be used as a clamp to removably secure the artificial dentures thereto.

A still further object of the invention is to provide a retaining appliance which is sufficiently flexible and resilient to prevent any rubbing or injury to the natural gum of the mouth.

The above and other objects in view will become apparent from the following detailed description, taken in conjunction with the accompanying drawing in which—

Figure 1 is a perspective view of an artificial denture with the retaining appliance attached thereto;

Figure 2 is a sectional view of the retaining appliance attached to an artificial gum;

Figure 3 is a perspective view of a removable bridge; and

Figure 4 is a sectional view of the retaining appliance as attached to a removable bridge.

The retaining appliance comprises a flexible plate 1 made of a very thin but strong material, such as German silver. Lugs 2 protrude from one side of said flexible plate 1 adjacent to the opposite ends thereof. The flexible plate 1 and the lugs 2 are covered with a soft rubber cover 3. Said cover may be made of any other suitable material commonly used for such purposes in the art. The lugs 2 correspond with bushings 4 fixedly secured in an artificial gum 5 of the denture. The amount of soft rubber surrounding the lugs 2 is cut to a thickness so as to permit the sliding thereof in the holes of the bushings 4. Springs 6 are disposed in the bushings 4 opposite the lugs 2. One end of said springs is anchored in the end of the bushings 4, while the other end of the springs is anchored in the lugs 2. The tendency of the springs 6 is to draw the plate 1 toward the artificial gum 5.

Set screws 7 extend thru bushings 8, said bushings 8 being fixedly secured in the artificial gum 5. Counterbores 9 in said artificial gum receive the heads of the set screws 7, while the bushings 8 are threaded inside so as to permit the screwing of the set screws 7 therein. Extensions 10 on the ends of the set screws 7 protrude toward the flexible plate 1 and are adapted to exert a pressure thereon and to move the plate against the action of the springs 6.

When the artificial denture is completed, the bushings 4 and 8 are vulcanized therein. Then the springs 6 are attached and vulcanized into the artificial gum 5, thereby securing the plate 1 therein. The set screws 7 are placed into the bushings 8 so as to extend to plate 1. The springs 6 draw the flexible plate 1 toward the gum 5. Then the denture is placed on the natural gum and is fitted thereto by screwing the set screws 7 against the plate 1. The plate 1 is thus pressed against the natural gum of the mouth and covers closely all the irregularities and undercuts of the natural gum. After the set screws 7 have adjusted the plate 1 so that it fits tightly against the natural gum, all the cavities of the denture may be vulcanized so as to prevent any foreign matter from being clogged between the plate and the gum or in any of the cavities.

It is evident that until the patient gets used to the wearing of the artificial denture, the dentist must gradually change the position of the screws 7 so as to adjust it to a comfortable fit to the natural gum. The device may be used as a clamp by the patient himself. After the denture is attached to the natural gum, the screws 7 are tightened up to press the plate 1 against the natural gum, thereby securing the denture thereto. When it is intended to remove the denture, the patient unscrews the screws 7, thereby releasing the pressure on the plate 1 and permitting the ready removal of the denture.

The retaining device heretofore described is mostly adapted to be used on a so-called plate or artificial denture carrying a full row of teeth. The retaining device shown in Figure 4 is adapted to be used in connection with removable bridges which carry only a limited number of teeth. A plate 12 is covered by a soft rubber cover 13 and is attached to an artificial gum 14 of a removable bridge by means of a set screw 15. The set screw is screwed into a bushing 16 attached to the artificial gum 14. An extension 17 at the end of the set screw 15 has a reduced portion 18 to be rotatable in the plate 12. The plate 12 is prevented from rotating with the set screw by the contact thereof with the natural gum, indicated in dotted lines in Fig. 4.

It is evident that by screwing or unscrewing the set screw 15, the extension 17 thereof rotates inside of the plate 12 and vulcanized soft rubber 13, thereby drawing the plate 12 toward the artificial gum 14 or pressing the plate 12 against the natural gum. An inside plate portion 19 of the bridge may be so formed that when the plate 12 is pressed against the natural gum, the inside plate 19 is drawn against the inside of the natural gum, thereby forming a complete clamp. The clamp heretofore described eliminates the metal rings used at present for clamping the bridge to the adjoining teeth. Said metal rings contact with the porcelain of the natural teeth and thereby very often causing the injury of the porcelain.

The exact location and the number of the retaining appliances on a denture must be determined by the dentist, according to the irregularities and undercuts of the natural gum. It is preferable to place the retaining devices opposite the deepest undercut of the natural gum. It is evident that the above retaining appliance serves a double purpose. First, it provides a ready adjustment for the fitting of the artificial denture to the natural gum. Secondly, it serves as a clamp which may be tightened up on the gum when the denture is attached thereto, or it may be loosened up before the denture is detached therefrom.

While I have elected to illustrate my invention in connection with a specific structure, it will be understood that I do not wish to be so limited, inasmuch as, in view of the disclosure, variations may be readily carried out by those versed in the art, without departing from the spirit of the invention or the scope of the claims herein.

What I claim as new and desire to secure by Letters Patent is:

1. In aritficial dentures an artificial gum, a pliant plate mounted on the gum, and adjustable means removably secured to the artificial gum to move said pliant plate relative to said gum.

2. In artificial dentures an artificial gum, a pliant plate, resilient means to secure said plate to the artificial gum, and adjustable means to move said plate relative to the artificial gum.

3. In artificial dentures an artificial gum, a pliant plate, resilient means to secure said pliant plate to the artificial gum, and means to move said plate relative to the artificial gum.

4. In artificial dentures an artificial gum, a pliant plate, resilient means to secure the pliant plate to the artificial gum, and adjustable means to press said plate against the natural gum of the mouth.

5. In artificial dentures an artificial gum, a pliant plate, resilient means adjacent to the opposite ends of the plate to secure said plate to said artificial gum, and adjustable threaded means disposed in said gum between said resilient means to press said plate against the natural gum.

6. In an artificial denture, an artificial gum adapted to extend over the natural gum; means between the artificial gum and the natural gum for gripping the natural gum; and means on the artificial gum to resiliently space said gripping means from the inside face of the artificial gum.

7. In an artificial denture, an artificial gum adapted to extend over the natural gum; a pliant plate disposed between the artificial gum and the natural gum; and means on the artificial gum to resiliently space said pliant plate from the inside face of the artificial gum.

8. In an artificial denture, an artificial gum adapted to extend over a natural gum; a pliant plate disposed between the artificial and the natural gums; and means to space said pliant plate from the artificial gum.

9. In an artificial denture, an artificial gum adapted to extend over a natural gum; a pliant plate disposed between the artificial and the natural gums; means slidable in the artificial gum for supporting said pliant plate in said position; and means mounted in the artificial gum for coacting with said supporting means for resiliently pressing said pliant plate against the natural gum.

In testimony whereof I affix my signature.

HARRY D. WILLEY.